United States Patent [19]

Fischer

[11] 4,182,091
[45] Jan. 8, 1980

[54] MOUNTING ARRANGEMENT

[76] Inventor: Artur Fischer, Weinhalde 34, D-7244 Waldachtal 3 (Tumlingen), Fed. Rep. of Germany

[21] Appl. No.: 878,741

[22] Filed: Feb. 17, 1978

[30] Foreign Application Priority Data

Mar. 23, 1977 [DE] Fed. Rep. of Germany ....... 2712670

[51] Int. Cl.² ............................................. E04B 1/38
[52] U.S. Cl. .................................... 52/508; 85/1 H; 85/1 R; 85/82; 403/167; 403/252
[58] Field of Search ............. 248/217.4; 85/1 A, 1 R, 85/82; 52/508; 403/167, 168, 252

[56] References Cited

U.S. PATENT DOCUMENTS

| 2,424,757 | 7/1947 | Klumpp | 248/27.3 X |
| 3,014,563 | 12/1961 | Bratton | 403/167 |
| 3,109,342 | 11/1963 | Disley | 85/82 |
| 3,471,183 | 10/1969 | Fischer | 52/508 X |
| 3,631,738 | 1/1972 | Harper | 403/252 |

FOREIGN PATENT DOCUMENTS

| 737206 | 6/1966 | Canada | 85/82 |
| 1015688 | 1/1966 | United Kingdom | 85/82 |

Primary Examiner—William H. Schultz
Attorney, Agent, or Firm—Michael J. Striker

[57] ABSTRACT

A mounting arrangement for mounting an object to a support structure at a predetermined distance from the latter, comprises an expansion sleeve having an inner hole and insertable into a hole of the support structure, an expander screw adapted to pass through a hole of the object to be mounted so as to support the latter, and partially insertable into the inner hole of the expansion sleeve so as to expand and to anchor the latter in the hole of the structure, and a sleeve-shaped spacer member having an inner hole, and adapted to be fitted onto the expander screw and insertable into the hole of the object to be mounted. The spacer member has resiliently yieldable elements adapted to be spring-loaded after insertion of the spacer member into the hole of the object to be mounted and operative for gripping the latter in the spacer member, and further elements for fixing the spacer member to the expander screw.

9 Claims, 1 Drawing Figure

U.S. Patent      Jan. 8, 1980      4,182,091
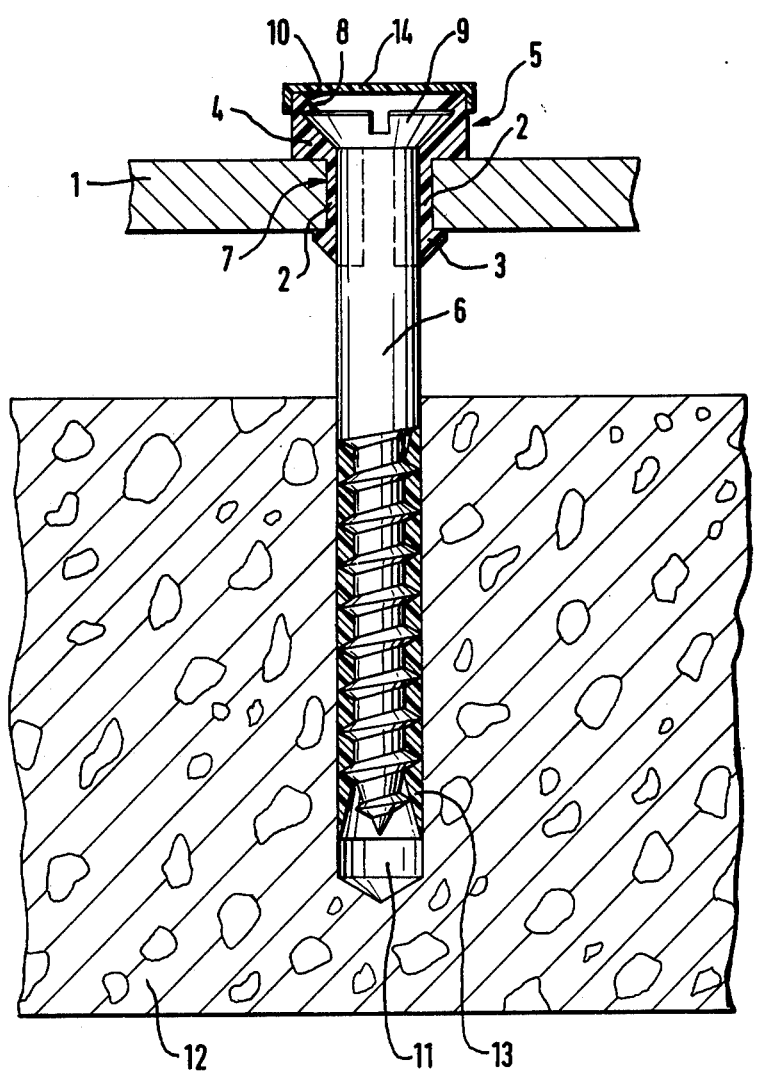

MOUNTING ARRANGEMENT

BACKGROUND OF THE INVENTION

The present invention relates to a mounting arrangement for mounting an object to a support structure at a predetermined distance from the latter.

Mounting arrangements for mounting an object to a support structure at a predetermined distance from the latter have been proposed in the art. In the known arrangement an expansion sleeve or dowel is inserted into a hole of the support structure and a portion of the expansion sleeve extends outwardly beyond the hole. Means for fixing the object to be mounted at a predetermined distance from the support structure is formed in the above portion of the expansion member extending outwardly beyond the hole of the support structure. It has been proven that these elements perform their functions well, with the assumption that an expander or mounting screw and the expansion sleeve or dowel are coordinated in their length relative to one another. In this case it is necessary to provide a plurality of the dowels as well as of the mounting screws with various sizes.

It has been further recognized that the dowel whose outer diameter corresponds to a diameter of the mounting screw, guarantees substantially high resistance to withdrawal in hard support structures. However, when the dowel or expansion sleeve has an outer diameter corresponding to the diameter of the mounting screw, a portion of the expansion sleeve cannot extend outwardly beyond the hole of the support structure so as to carry or to form means for holding the object at a predetermined distance from the support structure.

SUMMARY OF THE INVENTION

Accordingly, it is an object of the present invention to provide a mounting arrangement for mounting an object to the support structure at a predetermined distance from the latter, which avoids the disadvantages of the prior art.

More particularly, it is an object of the present invention to provide a mounting arrangement for mounting an object to a support structure at a predetermined distance from the latter, which includes a mounting screw and a sleeve shaped dowel having an outer diameter corresponding to the diameter of the mounting screw.

In keeping with these objects, and with others which will become apparent hereinafter, one feature of the present invention, briefly stated, resides in a mounting arrangement for mounting an object to a support structure at a predetermined distance from the latter including a sleeve-shaped dowel having an inner hole and insertable into a hole of the support structure, and a mounting screw adapted to pass through a hole of the object to be mounted so as to support the latter and partially insertable into the inner hole of the dowel, wherein a sleeve-shaped spacer member is provided adapted to be fitted into the mounting screw and insertable into the hole of the object to be mounted, which spacer member has resiliently yieldable means adapted to be spring-loaded after insertion of the spacer member into the hole of the object to be mounted and operative for gripping the latter in the spacer member, and further means for fixing the spacer member to the mounting screw.

When the spacer member is inserted into the hole of the object to be mounted at a predetermined distance from the support structure, the gripping means is compressed and thereafter expands after insertion so that the object is gripped by this means. When the mounting screw passes through the inner hole of the spacer member, the spacer member and the mounting screw are fixed relative to one another by the above fixing means. By threading the mounting screw into the dowel inserted in the support structure, the mounting element is anchored in a respective position. Fine adjustment of a distance at which the object might be mounted relative to the support structure is performed by varying a depth of threading the mounting element into the dowel. Coarse adjustment of a distance at which the object must be mounted relative to the support structure is performed by selection of the mounting screw with a shaft having a required length.

An essential advantage of the present invention is that for mounting an object at a predetermined distance from a support structure, commercially utilized mounting screws can be used, which can be separately selected with a respective length of the shaft thereof, and on the other hand, a dowel can be used, which has an outer diameter corresponding to the diameter of the mounting screw.

Another feature of the present invention is that the gripping means include an axial portion of the spacer member formed by two prongs extending in an axial direction and provided with two substantially radial projections hich are arranged on an outer surface of the prongs. The radial projections are located downwardly beyond and engage from below a lower face of the object to be mounted when the spacer member is inserted in the hole of the latter. The prongs have a sufficient resiliency which is necessary for clamping the spacer member in the hole of the object to be mounted. After insertion of the mounting screw in the inner hole of the spacer member, the prongs cannot move back, so that the radial projections provided on the prongs sufficiently support the object to be mounted at a predetermined distance from the support structure.

Still another feature of the present invention is that the spacer member has an upper portion located above and abutting against an upper face of the object to be mounted when the spacer member is inserted in the object. The fixing means is formed in the upper portion of the spacer member and is constituted by a ridge inwardly projecting from an inner wall bounding the inner hole of the spacer member in the region of the upper portion. The ridge partially overlaps an upper surface of a head of a mounting screw and thereby retains the mounting screw from above. Therefore, the object to be mounted is clamped between the radial projections of the resiliently yieldable prongs and the ridge of the upper portion of the spacer member.

A further feature of the present invention is that the spacer member has a groove formed by the above ridge and a lower surface of a wall bounding an extension of the inner hole of the spacer member. When the mounting screw is inserted in the inner hole of the spacer member, an upper edge of the head of the mounting screw engages in the above groove, whereas a lower portion of the head of the mounting screw abuts against the lower portion of the extension of the inner hole of the spacer member.

The novel features which are considered as characteristic for the invention are set forth in particular in the appended claims. The invention itself, both as to its construction and its method of operation, together with additional objects and advantages thereof, will be best understood from the following description of specific embodiments when read in connection with the accompanying drawings.

BRIEF DESCRIPTION OF THE DRAWING

The single FIGURE of the drawing is a view showing a mounting arrangement, a support structure, and an object to be mounted by means of the mounting arrangement at a predetermined distance from the support structure.

DESCRIPTION OF A PREFERRED EMBODIMENT

FIG. 1 shows a mounting arrangement for mounting an object identified by reference numeral 1 to a support structure identified by reference numeral 12 at a predetermined distance from the latter. The mounting arrangement includes a sleeve-shaped dowel 13 adapted to be anchored in an inner hole 11 of the support structure 12, a mounting screw 6 adapted to pass through a hole 7 of the object to be mounted and insertable into an inner hole of the dowel 13, and a spacer member identified in toto by reference numeral 5.

The spacer member 5 is sleeve-shaped and has two resiliently yieldable prongs 2 extending in an axial direction of the spacer member. The spacer member 5 has two axial ends, and arresting projections 3 are provided at one of the axial ends or in a lower portion of the spacer member 5. A radially extending portion 4 is provided at the other axial end of the spacer member 5. Thus, the object 1 to be mounted can be tightened between the arresting projections 3 and the radial portion 4 of the spacer member 5. Clamping of the spacer member 5 is performed before insertion of the mounting screw 6 into an inner hole of the spacer member 5, so that when the spacer member 5 passes through the hole 7 in the object 1 to be mounted, the resiliently yieldable prongs 2 can be radially inwardly compressed. The upper portion 4 abuts against an upper face of the object to be mounted, whereas the arresting projections 3 abuts against a lower face of the object.

The upper portion 4 of the spacer member 5 has a ridge 8 which inwardly projects from an inner wall of the inner hole of the spacer member 5. The ridge 8 is adapted to engage an end surface of a head 9 of the mounting screw 6. When the spacer member 5 is clamped in the object 1 to be mounted, the mounting screw 6 can pass through the inner hole of the spacer member 5 until the ridge 8 of the upper portion 4 of the spacer member 5 overlaps the end surface of the head 9 of the mounting screw 6. In order to facilitate the engagement of the head 9 of the mounting screw 6, the ridge 8 is provided with a bevel 10.

By means of the ridge 8, on the one hand, and the arresting projections 3 of the prongs 2, on the other hand, the spacer member 5 is axially fixed on the mounting screw 6 at a predetermined distance from the support structure 12 and thereby the object 1 to be mounted is also fixed to the mounting screw 6 at the predetermined distance from the support structure 12.

Anchoring is performed by threading the mounting screw 6 in the dowel 13 which is inserted in the hole 11 of the support structure 12. In order to attain great holding force in hard support structures, the dowel 13 has an outer diameter corresponding to a diameter of the mounting screw 6. A coarse distance of the object to be mounted from an upper surface of the wall of the support structure is determined by a length of a shaft of the mounting screw, whereas fine adjustment is performed by varying a depth of threading in.

Means for corrosion protection of the head 9 of the mounting screw 6 may be provided. This means may be formed as a protective cap 14 which is fitted on the spacer member 5 from above. On the other hand, this means may be formed as a disc which is clamped between the ridge 8 of the upper portion 4 of the spacer member 5 and the end surface of the head 9 of the mounting screw 6.

It will be understood that each of the elements described above, or two or more together, may also find a useful application in other types of constructions, differing from the types described above.

While the invention has been illustrated and described as embodied in a mounting arrangement for mounting an object to a support structure at a predetermined distance from the latter, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A mounting arrangement for mounting an object to a support structure at a predetermined distance from the latter, comprising a sleeve-shaped dowel having an inner hole and insertable into a hole of the support structure; a mounting screw adapted to pass through a hole of the object to be mounted so as to support the latter, and partially insertable into said inner hole of said dowel, said mounting screw having a leading end and a trailing end as considered in the direction of insertion thereof into said dowel, and a head provided at said trailing end; and a sleeve-shaped spacer member having an inner hole adapted to be fitted onto said mounting screw and insertable into the hole of the object to be mounted, said spacer member having resiliently yieldable means adapted to be spring-loaded after insertion of said spacer member into the hole of the object to be mounted and operative for gripping the object to be mounted from a surface facing toward the support structure, when said spacer member is inserted in the hole of the latter, said spacer member having an upper portion lying on a surface of the object to be mounted, which faces away from the support structure, and provided with a ridge overlapping an end surface of said head of said mounting screw, which faces away from the support structure.

2. A mounting arrangement for mounting an object to a support structure at a predetermined distance from the latter, the object having a lower face and an upper face facing toward and away from the support structure, the mounting arrangement comprising a sleeve-shaped dowel having an inner hole and insertable into a hole of the support structure; a mounting screw adapted to pass through a hole of the object to be mounted so as to support the latter, and partially insertable into said inner hole of said dowel, said mounting screw having a leading end and a trailing end as considered in the direction of insertion thereof into said dowel, said mounting screw further having a head provided at said trailing end thereof and having a lower surface and an upper surface; and a sleeve-shaped spacer member having an inner hole and adapted to be fitted onto said mounting screw and insertable into the hole of the object to be mounted, said spacer member having resiliently yieldable means adapted to be spring-loaded after insertion of said spacer member into the hole of the object to be mounted and operative for gripping the latter in said spacer member, said spacer member having an upper portion located above and abutting against the upper face of the object to be mounted, when said spacer member is inserted in the object, said spacer member having further means for fixing the same to said mounting screw, said fixing means including a ridge formed in said upper portion of said spacer member and projecting inwardly from an inner wall bounding said inner hole of said spacer member in the region of said upper portion, said ridge partially overlapping said upper surface of said head of said mounting screw and thereby retaining said mounting screw from above.

3. The arrangement as defined in claim 2, wherein said head of said mounting screw has an upper edge, said ridge of said spacer member forms with a remainder portion of said inner wall of said spacer member in the region of said upper portion thereof, a groove in which said edge of said head of said mounting screw engages.

4. The arrangement as defined in claim 2, wherein said inner hole of said spacer member has a radial extension in the region of said upper portion of said spacer member, a section of said inner wall bounding said radial extension of said inner hole partially overlapping said lower surface of said head of said mounting screw and thereby supporting said head of said mounting screw from below.

5. The arrangement as defined in claim 2, wherein the hole of the object to be mounted is bounded by a wall and said mounting screw has an outer surface, said spacer member being located between said outer surface of said mounting screw and the wall bounding the hole of the object to be mounted.

6. The arrangement as defined in claim 2, wherein said mounting screw is threadless in the region whereon said spacer member is to be fitted.

7. The arrangement as defined in claim 2, wherein said spacer member has an axis, and said gripping means includes an axial portion of said spacer member having an outer surface and provided with two substantially radial projections which are arranged on said outer surface.

8. The arrangement as defined in claim 7, wherein said axial portion is formed by two resiliently yieldable prongs extending in an axial direction of said spacer member.

9. The arrangement as defined in claim 7, wherein said radial projection is located downwardly beyond and engaging from below the lower face of the object to be mounted, when said spacer member is inserted in the hole of the latter.

* * * * *